United States Patent [19]

Nishi

[11] Patent Number: 4,662,734

[45] Date of Patent: May 5, 1987

[54] BELLOWS

[75] Inventor: Masahiro Nishi, Osaka, Japan

[73] Assignee: Kabushiki Kaisha Sakai Tokushu Camera Seisakusho, Toyonaka, Japan

[21] Appl. No.: 686,739

[22] Filed: Dec. 27, 1984

[30] Foreign Application Priority Data

Jan. 31, 1984 [JP] Japan .................. 59-14329

[51] Int. Cl.4 .......................... G03B 17/04; F16J 3/04
[52] U.S. Cl. .................... 354/187; 354/192; 138/121
[58] Field of Search .............. 354/187, 192, 193, 194; 138/121, 149

[56] References Cited

U.S. PATENT DOCUMENTS

| | | | |
|---|---|---|---|
| 1,500,391 | 7/1924 | Hutchings | 354/187 |
| 2,516,347 | 7/1950 | Schwartz et al. | 354/192 |
| 2,578,111 | 12/1951 | Turner et al. | 354/187 |
| 3,315,704 | 4/1967 | Shire | 138/121 |
| 3,375,767 | 4/1968 | Hanlon | 354/187 |
| 3,421,425 | 1/1969 | Brandt et al. | 354/187 |
| 3,861,423 | 1/1975 | Hedges | 138/121 |
| 4,325,769 | 4/1982 | Moyse et al. | 354/187 |
| 4,547,053 | 10/1985 | Tobler | 354/295 |

FOREIGN PATENT DOCUMENTS 8001872  4/1980  Fed. Rep. of Germany .

Primary Examiner—A. A. Mathews
Attorney, Agent, or Firm—Paul & Paul

[57] ABSTRACT

A bellows including a flexible tubular body of a sheet, which is bent in alternate directions along the length thereof on circumferential folds for extensibility, and reinforcements, printed on one surface of the sheet between adjacent circumferential folds.

12 Claims, 7 Drawing Figures

BELLOWS

BACKGROUND OF THE INVENTION

1. Field of the Invention

The present invention relates to a bellows which can be advantageously used in an optical instrument, such as a camera, or various kind of machine tools or which can be used as a passageway.

2. Description of the Related Art

A bellows in a camera is usually made of a flexible tubular body bent in alternate directions along folds spaced at predetermined distances along the length thereof so as to provide extensibility and retractility. Between the folds, reinforcements are provided on the tubular body to prevent the latter from easy deformation.

The sheet by which the tubular body is made is usually composed of three superimposed layers. The reinforcements are usually provided on the innermost layer. The reinforcements consist of paper or the like precut into strips of a predetermined shape. These strips are adhered to the innermost layer of the tubular body, for example, by means of paste. In particular, when the strips are irregular in shape, or improperly positioned by the paste, there is a decrease in the collapsibility, one of the most significant properties of a bellows, and the durability.

Accordingly, it is very important to precut the reinforcing paper into strips of a predetermined shape and adhere them to the innermost layer of the sheet with a high precision. These precut and adhesion operations must therefore be effected manually by a highly skilled person. It is, however, difficult to uniformly cut and adhere the strips with a high precision by a mass-production process.

SUMMARY OF THE INVENTION

The primary object of the present invention is to provide a mass-producible bellows free from the aforementioned drawbacks and having the same or higher quality by enabling the reinforcements to be easily and uniformly provided without the necessity of a highly skilled person.

In order to achieve the object mentioned above, according to the present invention, the bellows includes reinforcements which are printed on the surface of the tubular body. The reinforcements are preferably made of ink which foams when heated.

According to another aspect of the present invention, there is provided a predetermined pattern of conductors on the surface of the tubular body of the bellows. The pattern is preferably formed by printing.

According to still another aspect of the present invention, there is provided a light intercepting layer on the surface of the tubular body. The light intercepting layer is preferably also formed by printing.

According to still another aspect of the present invention, there is provided a heat conductive layer or a heat insulating layer on the surface of the tubular body.

BRIEF DESCRIPTION OF THE DRAWINGS

Other properties and advantages of the present invention will be made apparent from the following description with reference to the accompany drawings, in which.

DESCRIPTION OF THE PREFERRED EMBODIMENTS

Figure 1:
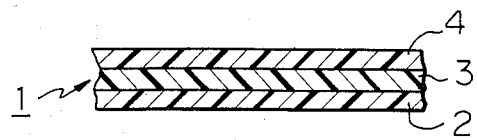
FIG. 1 is a side elevational view of a sheet with which a tubular body of a bellows of the invention is made.

The sheet forming the tubular body of the bellows has a multi-layered construction consisting of, for example, three layers 2, 3, and 4, i.e., an outer surface layer 2 made of nylon or other synthetic materials, a light intercepting intermediate layer 3 made of a compound of nylon and vinyl chloride, and an inner surface 4 made of nylon, nylon cloth, silk, artificial silk, cotton, or other fiber or cloth material. The materials of the three layers are not limited to the foregoing and other materials may be properly used.

The inner layer 4 is preferably colored black. The outer layer 2 is preferably embossed so that it has a sheepskin-like appearance. The intermediate layer 3 is preferably made of transparent nylon to which a black colorant is added to give a property of light interception thereto. In the case of a bellows for a camera, the sheet is preferably about 0.2 to 0.3 mm thick to give it a sufficient flexibility. The sheet is cut into a rectangular shape having a predetermined size of about 600 mm × 500 mm.

The inner layer 4 of the sheet is located up and coated with a predetermined pattern of foamable ink 5, e.g., foamable styrol or foamable urethane, for example, by a silk screen printing process, which is per se well known. Preferably, the foamable ink 5 has a white colored base material having a colorant dispersed therein to present a lusterless black color overall. Preferably, an additive is added to the foamable ink 5 to increase the rigidity thereof.

Figure 2:
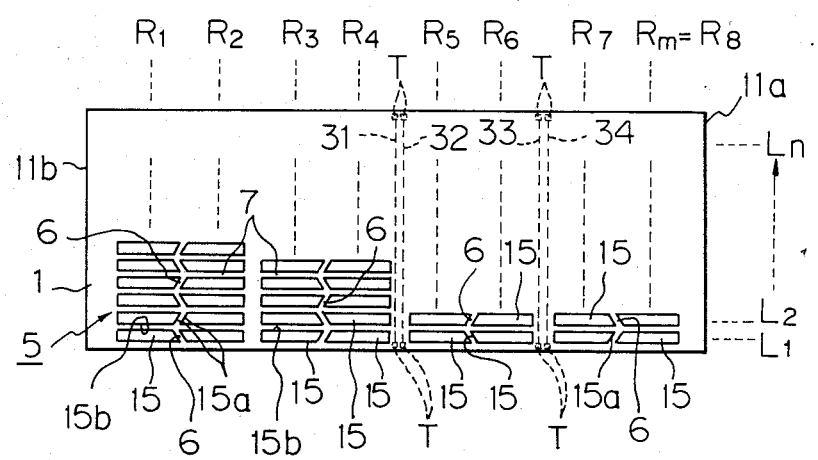
FIG. 2 is a plan view of a sheet on which reinforcements made of foamable ink are printed.

As can be seen from FIG. 2, the reinforcement layer formed by the foamable ink 5 consists of pieces of a generally rectangular shape with one inclined shorter side 15a. The rectangular pieces 15 are arranged so that adjacent pieces have their inclined sides 15a opposed to each other in parallel. Namely, the rectangular pieces 15 are distributed and aligned in lines L1, L2, ... Ln, and rows R1, R2, ... Rm. In the illustrated embodiment, there are eight (i.e., m=8) rows R. The number of the lines L depends on the axial length of the tubular body of the bellows and, accordingly, the number of folds 13 and 14, which will be described hereinafter.

Each of the four side faces of the angular tube of the bellows includes two rows of pieces 15 ($R_1$ & $R_8$, $R_2$ & $R_3$, $R_4$ & $R_5$, $R_6$ & $R_7$), when the bellows is completed.

The direction of inclination defined by the inclined sides 15a of adjacent two pieces 15 in a line L is opposite to that of the adjacent two pieces in a adjacent line L, so that spaces 6 defined by the adjacent inclined sides 15a presents a zigzag pattern. The direction of one zigzag line further differs from that of an adjacent zigzag line. The spaces 6 provide folds. Namely, in the illustrated embodiment, the sheet has four zigzag folds 6. Furthermore, between longer sides 15b of the adjacent pieces 15 are provided straight spaces which form parallel folds 7. The folds 6 correspond to inclined folds 16 (FIG. 5) of the completed product, i.e., the bellows.

Figure 3:
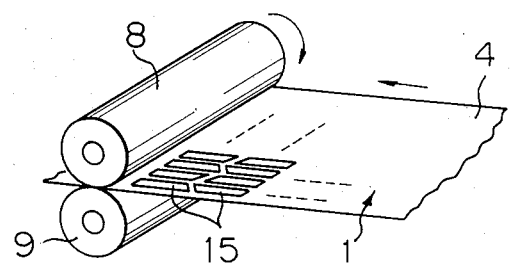
FIG. 3 is a schematic view showing a heating process of the sheet shown in FIG. 2.

FIG. 3 shows a heating process of the sheet 1 on which the foamable ink 5 has been printed. The sheet 1 is fed between a heating roller 8 and a counter roller 9, with the inner layer 4 facing the heating roller 8. When the sheet 1 passes between the two rollers 8 and 9, the sheet is heated by the heating roller 8, so that the ink 5 foams, resulting in a rise of the upper surface of the ink 5, i.e., the rectangular pieces 15, above the surface of the inner layer 4. The pieces 15 serve as reinforcements of the sheet 1, increasing the rigidity of the latter. The rigidity depends on the height of the rise and also on the kind and quantity of the additive. The height of the rise depends on the expansion ratio of the foamable ink. It is also possible to use a heater other than the heating roller 8, such as an infrared ray heater.

Figure 4:
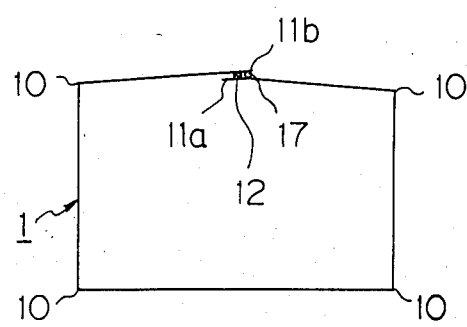
FIG. 4 is a front elevational view of a sheet which is bent into a substantially angular tube shape.

After the sheet 1 has been subjected to the heat-treatment, the circumferential edges thereof can be precisely cut to a predetermined size to obtain a desired bellows. After that, the sheet 1 is bent into an angle tube, as shown in FIG. 4. In the angle tube, corners 10 correspond to the zigzag folds 6 mentioned above. Ends 11a and 11b of the tube are interconnected by means of a transparent adhesive laminate 12, e.g., a nylon film which melts when heated, which is provided therebetween. The adhesive laminate 12 is heated to connect the opposite ends 11a and 11b together. Preferably, a black thread(s) 17 (FIG. 4) is (are) inserted between the opposite ends 11a and 11b along the axial length of the tube to prevent light from coming into the tube, i.e., the bellows through the interconnected portion.

Figure 5:
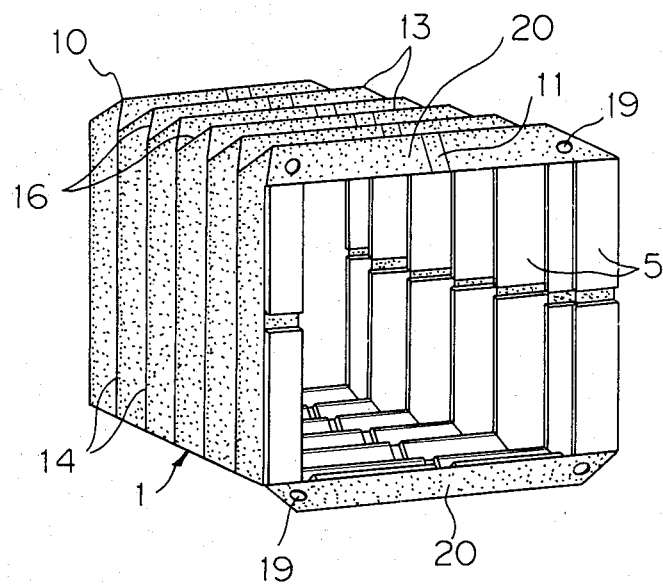
FIG. 5 is a perspective view of a bellows with circumferential folds in alternate directions along the length thereof.
Figure 7:
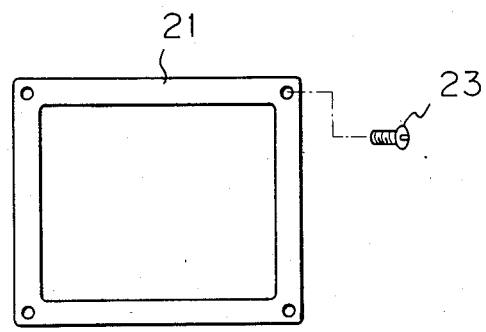
FIG. 7 is a front elevational view of a mounting frame which can be attached to ends of the bellows.

On the portions of the sheet 1 in the vicinity of longitudinal opposite ends 20 thereof (only one end is shown in FIG. 5) are formed holes 19. As is well known, mounting plates or frames 21 (FIG. 7) are attached to the ends 20. The plates or frames 21 are of a rectangular ring shape, as shown in FIG. 7, corresponding to the end openings of the bellows. Usually, a pair of mounting frames 21 hold therebetween the end portions 20 of the bellows and are connected together by means of, for example, set screws 23 (only one screw is shown in FIG. 7). The above-mentioned holes 19 are for the screws 23. For example, a pint glass back is connected to the mounting frame 21 of one end of the bellows and a lens board is connected to the mounting frame 21 of the other end of the bellows.

After that, the sheet 1 is bent in alternate directions along the length of the tube to form a bellows, as shown in FIG. 5. The sheet has horizontal folds 13 and vertical folds 14 lying in planes perpendicular to the length of the tube. The horizontal folds 13 and the vertical folds 14 are formed by folding the sheet along the parallel folds 7 in FIG. 2. On the other hand, the inclined folds 16 at the corner portions 10 of the tubular sheet 1 are formed by folding the sheet along the zigzag folds 6 in FIG. 2. It should be noted that the foamed ink 5 which constitutes the reinforcement members are distributed substantially throughout the inner surface 4 of the tubular sheet between the folds. Namely, the reinforcement members 5 are provided on the inner circumference 4 so that the reinforcement members 5 in each inner side face of the tube present rows of a V-shaped profile. Thus, the portions of the sheet that are located between the folds 13 and 14 are reinforced by the reinforcement member 5.

The sheet shown in FIG. 5 is then dried by a drier (not shown). For example, the sheet 1 is heated at 110° C. for about 3 minutes in the drier. This results in plastic deformation of the folds 13, 14 and 16, so that the bellows becomes stable in shape. Finally, fuzzy fibers which remain on the sheet are removed, for example, by burning them by an alcohol lamp or the like. Usually, the aforementioned mounting frames 21 are secured to the opposite ends of the bellows after the removal of the fuzzy fibers.

As can be understood from the above, according to the present invention, the sheet has its inner circumference coated with foamed ink as the reinforcement. Accordingly, no highly skilled person is needed for forming the reinforcement on the sheet, unlike the prior art. Furthermore, since the reinforcement can be made by printing, a high uniform quality of the reinforcements can be obtained. In addition, various patterns of reinforcements can be easily printed by a single printing plate.

Figure 6:
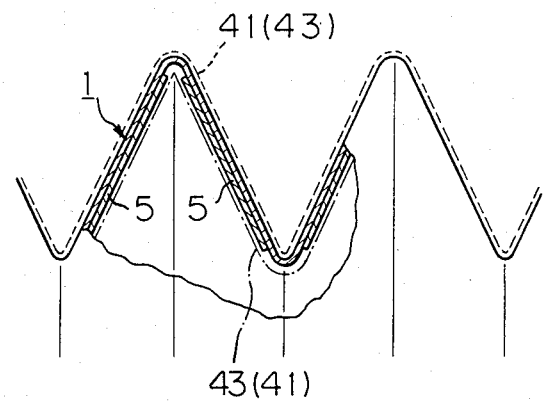
FIG. 6 is an enlarged and partially sectioned side elevational view of a part of the bellows shown in FIG. 5.

According to one embodiment of the present invention, the sheet itself has a light intercepting property due to the lusterless black ink. Therefore, according to this embodiment, a fourth special sheet layer for light interception which was sometimes necessary in the prior art, can be dispensed with. This means that the bellows of the present invention includes only two layers, i.e., the sheet 1 (considered one layer as a whole) and the printed reinforcement layer 5, as shown in FIG. 6. The decreased number of layers forming the bellows contributes to a decrease in weight and an increase in flexibility, thus resulting in the possibility of deformation and extension not only in the axial direction of the bellows but also in inclined directions with respect to the axial direction. The decreased number of the elements of the bellows also contributes to simplification of the manufacturing process and a decrease in the manufacturing costs.

While, in the illustrated embodiment, the reinforcement members were made of foamed ink, it is also possible to use common colored ink or thermosensitive ink. In such an alternative, it is necessary to print the colored ink or thermosensitive ink so as to have a predetermined thickness. The ink may have carbon dispersed therein for the purpose of light interception.

The printing process used to make the reinforcement may, in addition to silk screen printing, be offset printing, gravure printing, transfer, heat transfer, textile printing, etc.

In an autofocus camera or other electronically controlled camera, leads of electrical conductors and signal feeders for connecting a battery in a camera and a focusing device and for feeding various signals issued from sensors for detecting an object distance or degree of brightness are provided to the focusing device. For these electrical conductors and signal feeders, according to the present invention, a predetermined pattern of conductive layers for electrical conductors and/or signal feeders can be also provided on the sheet of the tubular body of the bellows.

The conductive layer can be made by printing on the inner layer 4, as shown in FIG. 2. In FIG. 2, the electrical conductors 31 and 32 and signal feeding conductors 33 and 34 are provided, for example, between adjacent rows of rectangular pieces 15 and extend along the length of the tube. The conductors 31, 32, 33, and 34 have, at their opposite ends, terminals T to which external conductors (not shown) are to be connected. The conductor pattern can be appropriately modified in accordance with requirements of a camera for which the bellows of the invention is used. According to the provision of the conductive layer integrally formed on the sheet of the bellows, leads which otherwise need to be provided in or out of the bellows can be dispensed with. For the conductive layer, ink having carbon dispersed therein, optical fibers, or coating materials for magnetic tapes can be used.

As mentioned before, according to the present invention, although the sheet 1 itself has a light interception property, it is also possible to coat the outer surface layer 2 or inner surface layer 4 with a light intercepting material, such as a black colored ink, by printing as mentioned before, in order to increase the light interception property, as shown at 41 in FIG. 6.

If the bellows of the invention is used as a passageway, for example, for connecting chambers which have different temperatures, it is also possible to coat the inner surface layer or the outer surface layer with a material which prevents or promotes the transfer of heat for a certain purpose. Such a heat-sensitive layer or a heat-intercepting layer can be also made by printing, as shown at 43 in FIG. 6.

The conductive layer 31, 34, the light intercepting layer 41, and the heat intercepting or transferring layer 43 can be made by multilayer printing.

It should be noted that the bellows of the present invention can be also used as a bellows in machine tools for the purpose of prevention of entrance of dust or other foreign material.

I claim:

1. A bellows comprising:
   a flexible tubular body of a sheet which is bent in alternate directions along the length therefore on circumferential folds for extensibility and retractibility and
   reinforcements printed on a surface of the body in a predetermined pattern between adjacent circumferential folds to increase the strength of the bellows, said reinforcements comprising an ink material which will harden subsequent to being printed, wherein said ink foams when heated.

2. A bellows comprising:
   a flexible tubular body of a sheet which is bent in alternate directions along the length therefore on circumferential folds for extensibility and retractility and
   reinforcements provided on a surface of the body between adjacent circumferential folds to increase the strength of the bellows, said reinforcements comprising a heat-foamable ink material in a predetermined pattern printed on the surface of the body.

3. A bellows according to claim 2, wherein said sheet comprises three layers interposed one on another, consisting of an outer layer, and intermediate layer, and an inner layer.

4. A bellows according to claim 2, further comprising conductive layer of a predetermined pattern which is provided on the surface of the sheet.

5. A bellows according to claim 2, further comprising a layer of a predetermined pattern provided on the surface of the body for feeding electrical signals.

6. A bellows according to claim 4, wherein said conductive layer is printed on the surface of the sheet.

7. A bellows according to claim 5, wherein said signal feeding layer is printed on the surface of the sheet.

8. A bellows according to claim 2, further comprising a heat transfer layer provided on the surface of the sheet.

9. A bellows according to claim 8, wherein said heat transfer layer is printed on the surface of the sheet.

10. A bellows according to claim 2, further comprising a layer which is provided on the surface of the sheet to prevent the transmission of heat.

11. A bellows according to claim 10, wherein said layer is printed on the surface of the sheet.

12. A bellows according to claim 2, further comprising a light interception layer printed on the surface of the sheet.

* * * * *